US009323456B2

(12) United States Patent
Zhen et al.

(10) Patent No.: US 9,323,456 B2
(45) Date of Patent: Apr. 26, 2016

(54) MULTI-CHARACTER CONTINUOUS HANDWRITING INPUT METHOD

(75) Inventors: Lixin Zhen, Shanghai (CN); Teng Long, Shanghai (CN)

(73) Assignee: INTSIG INFORMATION CO., LTD, Shanghai (CN)

( * ) Notice: Subject to any disclaimer, the term of this patent is extended or adjusted under 35 U.S.C. 154(b) by 241 days.

(21) Appl. No.: 13/992,372

(22) PCT Filed: Aug. 3, 2011

(86) PCT No.: PCT/CN2011/077942
§ 371 (c)(1),
(2), (4) Date: Jul. 30, 2013

(87) PCT Pub. No.: WO2012/075820
PCT Pub. Date: Jun. 14, 2012

(65) Prior Publication Data
US 2013/0314363 A1    Nov. 28, 2013

(30) Foreign Application Priority Data
Dec. 10, 2010    (CN) .......................... 2010 1 0583582

(51) Int. Cl.
G06F 3/01    (2006.01)
G06F 3/0488    (2013.01)
G06K 9/00    (2006.01)

(52) U.S. Cl.
CPC ............ *G06F 3/04883* (2013.01); *G06F 3/018* (2013.01); *G06K 9/00416* (2013.01)

(58) Field of Classification Search
CPC .............. G06F 3/018; G06F 30/04883; G06K 9/00416
See application file for complete search history.

(56) References Cited

U.S. PATENT DOCUMENTS 5,940,534 A * 8/1999 Wakahara et al. ............ 382/187
7,409,090 B2 * 8/2008 Akiyama ...................... 382/187
(Continued)

FOREIGN PATENT DOCUMENTS

| CN | 1604016 A | 4/2005 |
|---|---|---|
| CN | 101620501 A | 1/2010 |
| CN | 102156608 A | 8/2011 |

OTHER PUBLICATIONS

International Search Report issued in International Patent Application No. PCT/CN2011/077942 dated Oct. 20, 2011.

*Primary Examiner* — Ariel Balaoing
(74) *Attorney, Agent, or Firm* — Oliff PLC

(57) ABSTRACT

A multi-character continuous handwriting input method where a character is written on a touch unit and after an $i^{th}$ character is written, an $(i+1)^{th}$ character is written in an overlapping manner on the $i^{th}$ character. When a user is writing, it is determined whether a current stroke belongs to the $i^{th}$ character or $(i+1)^{th}$ character; if it is the $(i+1)^{th}$ character, the display color of the $i^{th}$ character is dimmed automatically, so that the user clearly sees the newly written character on a display screen. Multiple characters can be written continuously without pauses and when an $(i+2)^{th}$ character is written, the $i^{th}$ character disappears automatically from the screen, and the color of the $(i+1)^{th}$ character is dimmed automatically. Thus, the ability to continuously write multiple handwritten characters on a screen and the corresponding recognition and display processing significantly improves the input efficiency of handwritten text.

6 Claims, 4 Drawing Sheets

(56) References Cited

U.S. PATENT DOCUMENTS

| | | | |
|---|---|---|---|
| 7,502,017 B1 * | 3/2009 | Ratzlaff et al. | 345/173 |
| 8,094,941 B1 * | 1/2012 | Rowley et al. | 382/187 |
| 2004/0017946 A1 * | 1/2004 | Longe et al. | 382/185 |
| 2006/0085767 A1 * | 4/2006 | Hinckley et al. | 715/863 |

* cited by examiner

MULTI-CHARACTER CONTINUOUS HANDWRITING INPUT METHOD

BACKGROUND OF THE PRESENT INVENTION

1. Field of Invention

The present invention belongs to the technical field of handwriting input, relates to a handwriting input method, and specifically relates to a multi-character continuous handwriting input method.

2. Description of Related Arts

In recent years, the handwriting input method, as an important text input manner, has been widely applied to many mobile electronic devices such as smart phones, tablet computers, netbooks, Global Positioning System (GPS) terminals, learning machines, and the like. The handwriting input method generally refers to that a user writes text with a pen or a finger on a touch screen of an electronic device; meanwhile, the electronic device recognizes collected the writing tracks of the text, converts the tracks to corresponding text and displays the text on the screen. Currently, due to the size limitation of a touch screen of a mobile device, in general cases, a user can only write one character on the touch screen each time; after finishing writing a character, the user usually needs to pause for a period (a typical pause lasts about 200 ms to 1000 ms), waiting for the mobile device to detect and recognize a previously written character, before inputting a next character through handwriting. As a result, the input efficiency of handwritten text is low, and people cannot carry out continuous handwriting input in accordance with their natural writing habit.

In order to improve the handwriting input efficiency, related researchers develop a full-screen writing and full-screen recognition handwriting input solution, in which a small number of characters can be written on the touch screen at one time. However, the method is still restricted by the size of the touch screen, does not allow continuous writing of any number of characters (for example, finishing writing a complete sentence); especially, on a mobile electronic device where the size of the touch screen is limited (such as a smart phone), only a small number of characters can be written on the full touch screen (especially, only less than four characters can be written on a touch screen that senses finger writing); moreover, if different characters are connected or overlapped when a user writes on a full screen, a recognition engine may fail to correctly segment and recognize characters.

SUMMARY OF THE PRESENT INVENTION

The technical problem to be solved by the present invention is providing a multi-character continuous handwriting input method, which allows a user to write different characters without pauses, and allows continuous writing of multiple handwritten characters on a handwriting screen and corresponding recognition and display processing, thereby significantly improving the input efficiency of handwritten text.

In order to solve the above-mentioned problem, the present invention adopts the following technical solution:

A multi-character continuous handwriting input method, where the method comprises the following steps:

Step 110: touching a touch screen with a handwriting pen or a finger to start inputting a stroke;

Step 120: moving the handwriting pen or the finger on the touch screen; recording a stroke track and displaying the stroke track on a handwriting area on the touch screen;

Step 130: moving the handwriting pen or the finger away from the touch screen, current stroke input being finished;

Step 140: determining whether the currently written stroke and a previously input stroke belong to the same character; if yes, going to Step 150; otherwise, going to Step 170;

Step 150: determining whether a new stroke is inputted; if yes, going to Step 120; otherwise, going to Step 160;

Step 160: submitting a currently written character track to a recognition engine for recognition, and outputting a recognition result; going to Step 220;

Step 170: determining whether some character on the touch screen is dimmed; if yes, going to Step 180; otherwise, going to Step 190, wherein the dimmed character refers to a previous handwritten character that has been written and recognized, and a stroke color thereof has been processed in Step 200;

Step 180: clearing a previous dimmed character;

Step 190: forming all strokes except the current stroke into a handwritten character, submitting the handwritten character to the recognition engine for recognition, and outputting a recognition result;

Step 200: dimming a stroke color of the handwritten character formed of all the strokes except the current stroke, or making colors of an $(i+1)^{th}$ character and an $i^{th}$ character different, where the character is defined as a dimmed character; and Step 210: determining whether a new stroke is inputted; if yes, going to Step 120; otherwise, going to Step 160; and Step 220: ending.

As a preferred implementation of the present invention, in Step 140, the determining whether the currently written stroke and previously input strokes belong to same character is performed according to a relationship between geometric position information of the currently written stroke and geometric position information of a character formed of all the previously input strokes, which comprises the following steps:

Step 141: determining whether the current stroke is the first stroke inputted by the user; if yes, going to Step 146; otherwise, going to Step 142;

Step 142: determining whether the current stroke is a new character stroke on the right side of a previous stroke; if yes, going to Step 145; otherwise, going to Step 143;

Step 143: determining whether the current stroke overlaps another previously written stroke; if yes, going to Step 144; otherwise, going to Step 145;

Step 144: determining whether an overlapping degree between the current stroke and the previously written stroke is greater than a given threshold; if yes, going to Step 146; otherwise, going to Step 145;

Step 145: returning a determination result that the currently input stroke and the previously input stroke probably belong to the same character; and Step 146: returning a determination result that the currently input stroke and the previously input stroke do not belong to the same character.

A multi-character continuous handwriting input method comprises the following steps:

writing a character on a touch unit; after writing an $i^{th}$ character, writing an $(i+1)^{th}$ character on the $i^{th}$ character in an overlapping manner;

when a user is writing, determining whether a current stroke belongs to the $i^{th}$ character or $(i+1)^{th}$ character;

when it is determined that the user starts writing the $(i+1)^{th}$ character in an overlapping manner, dimming a display color of strokes of the $i^{th}$ character automatically, so that the user sees a clear track of a newly written character on a display screen; and continuously writing multiple characters without pauses according to the above manner, wherein when an $(i+2)^{th}$ character is written, the $i^{th}$ character disappears automatically from the display screen, and the color of the $(i+1)^{th}$ character is dimmed automatically, or colors of the $(i+1)^{th}$ character and the $(i+2)^{th}$ character are made to be different.

As a preferred solution of the present invention, the method for determining whether the current stroke written by the user belongs to the $i^{th}$ character or $(i+1)^{th}$ character comprises the following steps:

Step 141: determining whether the current stroke is the first stroke inputted by the user; if yes, going to Step 146; otherwise, going to Step 142;

Step 142: determining whether the current stroke is a new character stroke on the right side of a previous stroke; if yes, going to Step 145; otherwise, going to Step 143;

Step 143: determining whether the current stroke overlaps another previously written stroke; if yes, going to Step 144; otherwise, going to Step 145;

Step 144: determining whether an overlapping degree between the current stroke and the previously written stroke is greater than a given threshold; if yes, going to Step 146; otherwise, going to Step 145;

Step 145: returning a determination result that the currently input stroke and the previously input stroke probably belong to the same character; and Step 146: returning a determination result that the currently input stroke and the previously input stroke do not belong to the same character.

In order to implement the present invention, the following hardware conditions are required: the device needs to equipped with general operation and storage apparatuses, comprising a Central Processing Unit (CPU) of a certain frequency, certain memory for operation and system software for storage, a basic operating system, application software, a storage space for various data, and the like. The device needs a touch screen that allows for handwriting; any area on the touch screen may be specified as a handwriting input area; the touch screen further has a display area for displaying a recognition result, a command button area, and the like.

The present invention has the following beneficial effects: the multi-character continuous handwriting input method of the present invention allows a user to carry out continuous handwriting input on a touch screen in accordance with people's natural handwriting habit, and allows continuous writing of multiple handwritten characters without pauses; the handwriting recognition engine automatically recognizes and outputs the track inputted by the user, thereby effectively improving the efficiency of handwriting input.

DETAILED DESCRIPTION OF THE PREFERRED EMBODIMENTS

The exemplary embodiments of the present invention are described in detail below with reference to the accompanying drawings.

Embodiment 1

By means of the overlapping writing manner, the present invention allows a user to continuously write multiple handwritten characters without pauses and allows for corresponding recognition processing, thereby effectively improving the input efficiency of written text, and providing a freer and more efficient handwriting input manner.

Figure 1:
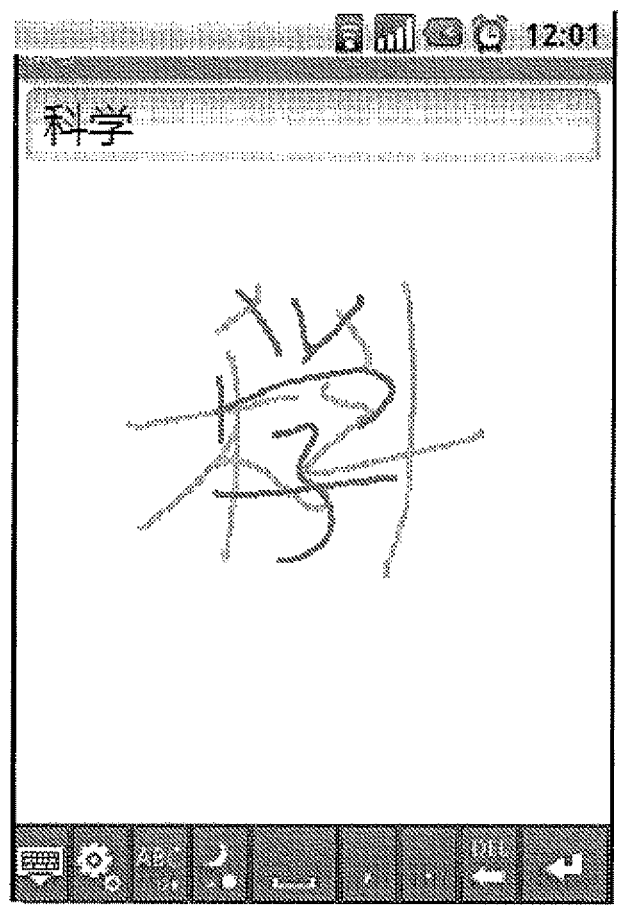
FIG. 1 shows an example of an overlapping writing manner.
Figure 2:
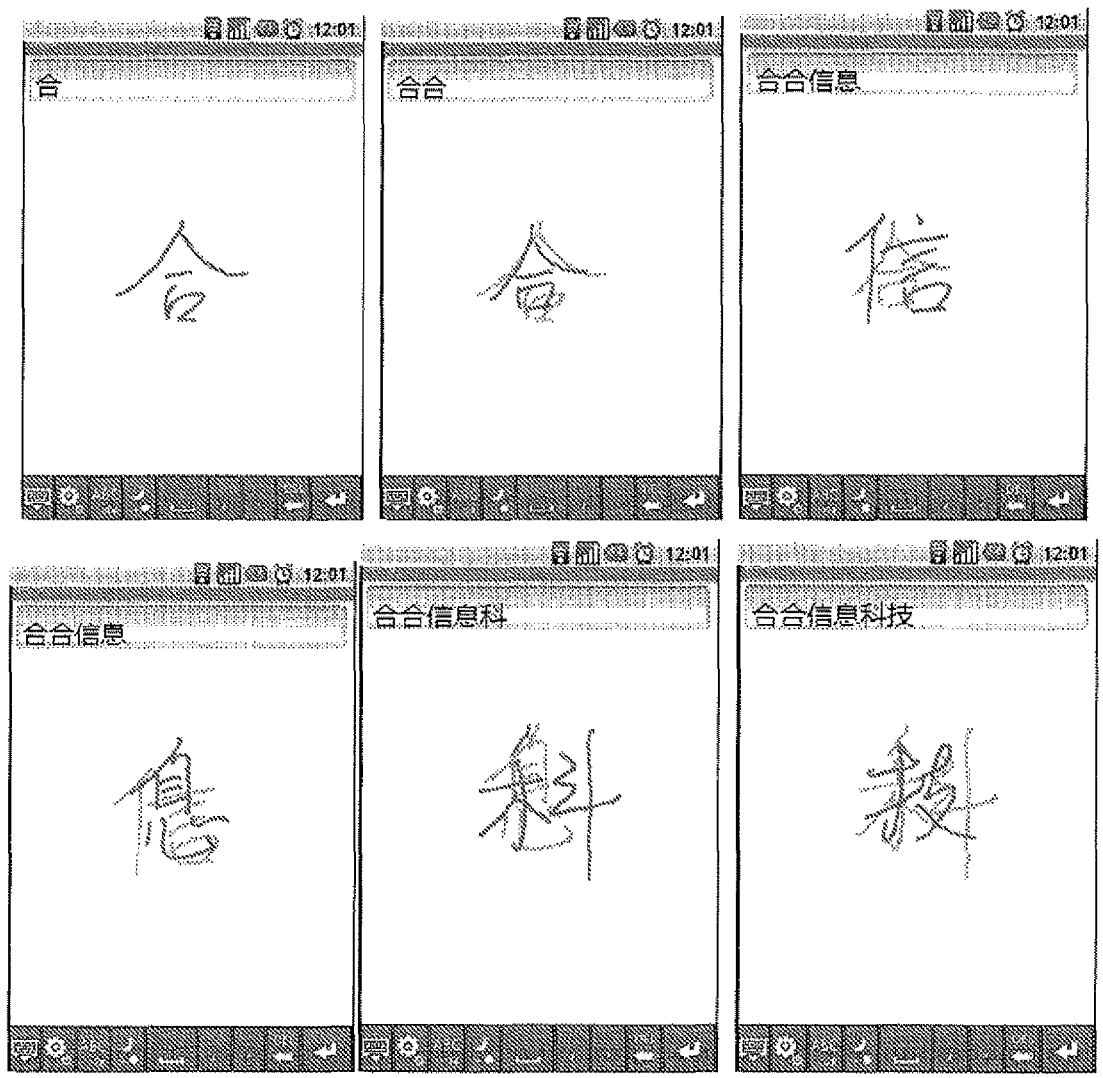
FIG. 2 demonstrates a process of writing six characters of "合合信息科技" in an overlapping manner and recognizing the handwritten character string by a recognition engine.

The overlapping writing manner refers to that after finishing writing a character, a user can write a next character in an overlapping manner on the first character. As shown in FIG. 1, when a user continuously writes two characters of "科学", the second character "学" may be written in an area overlapping that of the first character. Through a related technical means, different strokes of the first character and the second character can be detected; when the user starts writing a second character in an overlapping manner, a stroke display color of the first character is dimmed automatically, so that the user can see a clear track of the newly written character on a display screen. In this manner, multiple characters can be written continuously without pauses; when a third character is written, the first character automatically disappears from the display screen, while the color of the second character is dimmed automatically; the rest can be done in the same manner. FIG. 2 is a schematic view of a processing result of an electronic device and a corresponding processing result of character color conversion when six characters of "合合信息科技" is written.

The device for implementing the present invention may be a smart phone (such as the HTC/Google Nexus One smart phone) with a touch screen, where the cell phone has a touch screen that can collect stroke tracks written by a user with a finger. The C++ language is used to write various processing programs, and hence the present invention can be implemented desirably. The present invention can also be implemented on other mobile electronic devices such as a tablet computer, a Personal Digital Assistant (PDA) and a GPS terminal; the present invention can also be implemented by using other programming languages such as Java.

Figure 3:
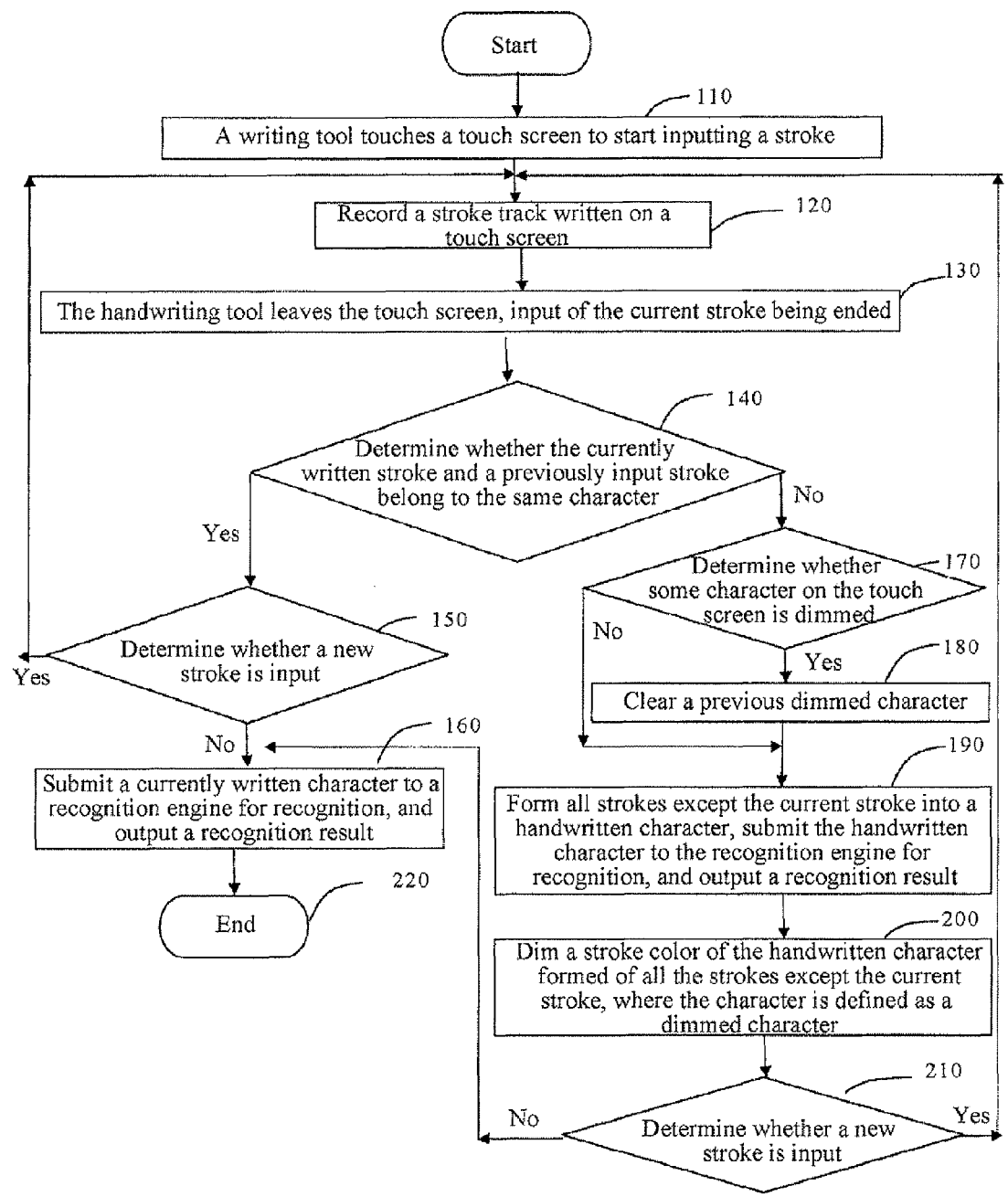
FIG. 3 is a flow chart of the method according to the present invention.

Referring to FIG. 3, the present invention discloses a multi-character continuous handwriting method, comprising the following steps:

Step 110: A finger touches a touch screen to start inputting a stroke; a program detects an event that the finger touches the touch screen, and starts recording a character stroke track inputted by a user.

Step 120: A handwriting pen or the finger moves on the touch screen; the program records a handwriting stroke track and displays the stroke track on a handwriting area on the touch screen; in this embodiment, a currently written character stroke is displayed in red color (certainly, the currently written stroke may also be displayed in other colors, which does not affect the substantial content of the present invention).

Step 130: The handwriting pen or the finger leaves the touch screen, input of the current stroke being ended.

Step 140: Determine whether the currently written stroke and a previously input stroke belong to the same character; if yes, go to Step 150; otherwise, go to Step 170.

Figure 4:
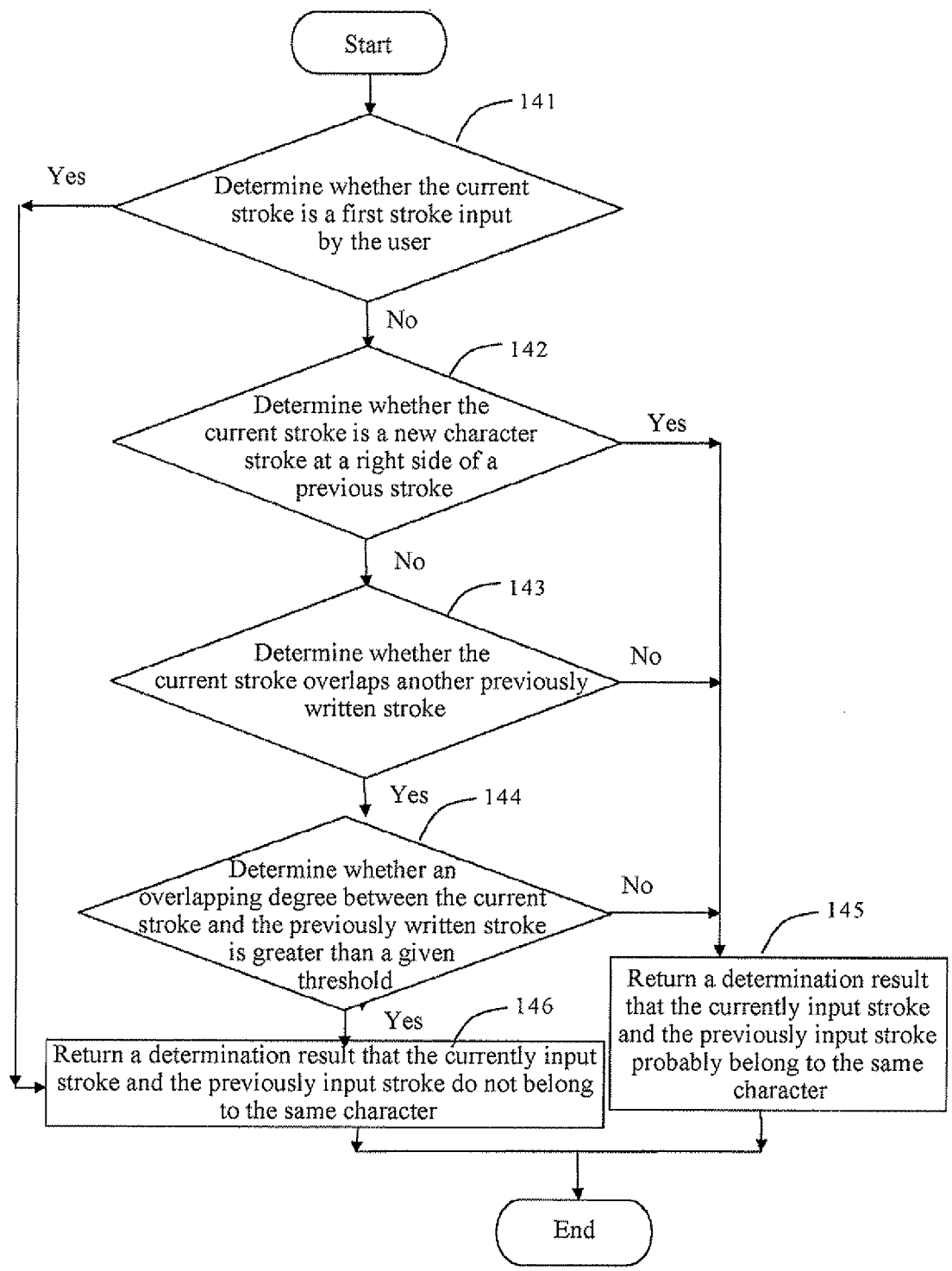
FIG. 4 is a flow chart of determining whether a currently written stroke and a previous stroke belong to a same character.

The determining whether the currently written stroke and a previously input stroke belong to the same character is performed according to a relationship between geometric position information of the currently written stroke and geometric position information of a character formed of all the previously input strokes, a specific implementation flow chart is shown in FIG. 4.

Step 150: Determine whether a new stroke is inputted; if yes, go to Step 120; otherwise, go to Step 160.

Step 160: Submit a currently written character track to a recognition engine for recognition, and output a recognition result; go to Step 220.

Step 170: Determine whether some character on the touch screen is dimmed; if yes, go to Step 180; otherwise, go to Step 190.

The dimmed character refers to a previous handwritten character that has been written and recognized, and a stroke color thereof has been processed in Step 200; or colors of an $(i+1)^{th}$ character and an $i^{th}$ character are made to be different.

Step 180: Clear a previous dimmed character.

Step 190: combine all strokes except the current stroke into a handwritten character, submit the handwritten character to the recognition engine for recognition, and output a recognition result.

Step 200: Dim a stroke color of the handwritten character formed of all the strokes except the current stroke (in this embodiment, a grey color is used as a dimmed color of the stroke), where the character is defined as a dimmed character; or make colors of an $(i+1)^{th}$ character and an $i^{th}$ character different.

Step 210: Determine whether a new stroke is inputted; if yes, go to Step 120; otherwise, go to Step 160.

Step 220: End.

Referring to FIG. 4, in Step 140, the determining whether the currently written stroke and a previously input stroke belong to a same character is performed according to a relationship between geometric position information of the currently written stroke and geometric position information of a character formed of all the previously input strokes, which comprises the following steps:

Step 141: Determine whether the current stroke is the first stroke inputted by the user; if yes, go to Step 146; otherwise, go to Step 142.

Step 142: Determine whether the current stroke is a new character stroke at a right side of a previous stroke; if yes, go to Step 145; otherwise, go to Step 143.

Step 143: Determine whether the current stroke overlaps another previously written stroke; if yes, go to Step 144; otherwise, go to Step 145.

Step 144: Determine whether an overlapping degree between the current stroke and the previously written stroke is greater than a given threshold; if yes, go to Step 146; otherwise, go to Step 145.

Step 145: Return a determination result that the currently input stroke and the previously input stroke probably belong to the same character.

Step 146: Return a determination result that the currently input stroke and the previously input stroke do not belong to the same character.

Embodiment 2

The embodiment discloses a multi-character continuous handwriting input method, comprising the following steps:

A character is written on a touch unit; after writing an $i^{th}$ character, an $(i+1)^{th}$ character is written on the $i^{th}$ character in an overlapping manner.

When a user is writing, it is determined whether a current stroke belongs to the $i^{th}$ character or $(i+1)^{th}$ character.

When it is determined that the user starts writing the $(i+1)^{th}$ character in an overlapping manner, a display color of strokes of the $i^{th}$ character is dimmed automatically, or colors of the $i^{th}$ character and the $(i+1)^{th}$ character are made to be different, so that the user sees a clear track of a newly written character on a display screen.

Multiple characters are written continuously without pauses according to the above manner, wherein when an $(i+2)^{th}$ character is written, the $i^{th}$ character disappears automatically from the display screen, and the color of the $(i+1)^{th}$ character is dimmed automatically, or colors of the $(i+1)^{th}$ character and the $(i+2)^{th}$ character are made to be different.

In conclusion, the multi-character continuous handwriting input method provided by the present invention allows a user to carry out continuous handwriting input on a touch screen in accordance with people's natural writing habit, and allows continuous writing of multiple handwritten characters without pauses; the handwriting recognition engine automatically recognizes and outputs the track inputted by the user, thereby effectively improving the efficiency of handwriting input.

Herein, the description and application of the present invention are illustrative, and the scope of the present invention is not intended to be limited to the above embodiments. Variations and changes to the embodiments disclosed herein are possible. Replacement made to the embodiments and equivalent parts are well-known to persons skilled in the art. It should be known to persons skilled in the art that, the present invention can be implemented in other forms, structures, arrangements, ratios and through other components, materials, and parts without departing from the script or essential features of the present invention. Other variations and changes may be made to the embodiments disclosed herein without departing from the scope and script of the present invention.

What is claimed is:

1. A multi-character continuous handwriting input method, comprising the following steps:

Step 110: touching a touch screen with a handwriting pen or a finger to start inputting a stroke;

Step 120: moving the handwriting pen or the finger on the touch screen; recording a stroke track and displaying the stroke track on a handwriting area on the touch screen;

Step 130: moving the handwriting pen or the finger away from the touch screen, current stroke input being finished;

Step 140: determining whether the currently written stroke and a previously input stroke belong to the same character; if yes, going to Step 150; otherwise, going to Step 170;

wherein the determining whether the currently written stroke and a previously input stroke belong to the same character is performed according to a relationship between geometric position information of the currently written stroke and geometric position information of a character formed of all the previously input strokes, comprising the following steps:

Step 141: determining whether the current stroke is the first stroke inputted by the user; if yes, going to Step 146; otherwise, going to Step 142;

Step 142: determining whether the current stroke is a new character stroke on the right side of a previous stroke; if yes, going to Step 145; otherwise, going to Step 143;

Step 143: determining whether the current stroke overlaps another previously written stroke; if yes, going to Step 144; otherwise, going to Step 145;

Step 144: determining whether an overlapping degree between the current stroke and the previously written stroke is greater than a given threshold; if yes, going to Step 146; otherwise, going to Step 145;

Step 145: returning a determination result that the currently input stroke and the previously input stroke probably belong to the same character; and Step 146: returning a determination result that the currently input stroke and the previously input stroke do not belong to the same character;

Step 150: determining whether a new stroke is inputted; if yes, going to Step 120; otherwise, going to Step 160;

Step 160: submitting a currently written character track to a recognition engine for recognition, and outputting a recognition result; going to Step 220;

Step 170: determining whether some character on the touch screen is dimmed; if yes, going to Step 180; otherwise, going to Step 190, wherein the dimmed character refers to a previous handwritten character that has been written and recognized, and a stroke color thereof has been processed in Step 200;

Step 180: clearing a previous dimmed character;

Step 190: combining all strokes except the current stroke into a handwritten character, submitting the handwritten character to the recognition engine for recognition, and outputting a recognition result;

Step 200: dimming the stroke color of the handwritten character formed of all the strokes except the current stroke, or making colors of an $(i+1)^{th}$ character and an $i^{th}$ character different, wherein the character is defined as a dimmed character; and Step 210: determining whether a new stroke is inputted; if yes, going to Step 120; otherwise, going to Step 160; and Step 220: ending.

2. A multi-character continuous handwriting input method, comprising the following steps:

Step 110: touching a touch screen with a handwriting pen or a finger to start inputting a stroke;

Step 120: moving the handwriting pen or the finger on the touch screen; recording a stroke track and displaying the stroke track on a handwriting area on the touch screen;

Step 130: moving the handwriting pen or the finger away from the touch screen, current stroke input being finished;

Step 140: determining whether the currently written stroke and a previously input stroke belong to the same character; if yes, going to Step 150; otherwise, going to Step 170;

Step 150: determining whether a new stroke is inputted; if yes, going to Step 120; otherwise, going to Step 160;

Step 160: submitting a currently written character track to a recognition engine for recognition, and outputting a recognition result; going to Step 220;

Step 170: determining whether some character on the touch screen is dimmed; if yes, going to Step 180; otherwise, going to Step 190, wherein the dimmed character refers to a previous handwritten character that has been written and recognized, and a stroke color thereof has been processed in Step 200;

Step 180: clearing the previous dimmed character;

Step 190: combining all strokes except the current stroke into a handwritten character, submitting the handwritten character to the recognition engine for recognition, and outputting a recognition result;

Step 200: dimming the stroke color of the handwritten character formed of all the strokes except the current stroke, or making colors of an $(i+1)^{th}$ character and an $i^{th}$ character different, wherein the character is defined as a dimmed character; and Step 210: determining whether a new stroke is inputted; if yes, going to Step 120; otherwise, going to Step 160; and Step 220: ending.

3. A multi-character continuous handwriting input method, comprising the following steps:

writing a character on a touch unit; after writing an $i^{th}$ character, writing an $(i+1)^{th}$ character on the $i^{th}$ character in an overlapping manner;

when a user is writing, determining whether the current stroke belongs to the $i^{th}$ character or the $(i+1)^{th}$ character;

when it is determined that the user starts writing the $(i+1)^{th}$ character in an overlapping manner, dimming a display color of strokes of the $i^{th}$ character automatically, so that the user sees a clear track of a newly written character on a display screen; and continuously writing multiple characters without pauses according to the above manner, wherein when an $(i+2)^{th}$ character is written, the $i^{th}$ character disappears automatically from the display screen, and the color of the $(i+1)^{th}$ character is dimmed automatically, or colors of the $(i+1)^{th}$ character and the $(i+2)^{th}$ character are made to be different.

4. The multi-character continuous handwriting input method as in claim 3, wherein:

a method for determining whether the current stroke written by the user belongs to the $i^{th}$ character or $(i+1)^{th}$ character comprises the following steps:

Step 141: determining whether the current stroke is a first stroke inputted by the user; if yes, going to Step 146; otherwise, going to Step 142;

Step 142: determining whether the current stroke is a new character stroke at a right side of a previous stroke; if yes, going to Step 145; otherwise, going to Step 143;

Step 143: determining whether the current stroke overlaps another previously written stroke; if yes, going to Step 144; otherwise, going to Step 145;

Step 144: determining whether an overlapping degree between the current stroke and the previously written stroke is greater than a given threshold; if yes, going to Step 146; otherwise, going to Step 145;

Step 145: returning a determination result that the currently input stroke and the previously input stroke probably belong to a same character; and Step 146: returning a determination result that the currently input stroke and the previously input stroke do not belong to the same character.

5. The multi-character continuous handwriting input method as in claim 1, wherein the multi-character continuous handwriting input method is a left-to-right handwriting input method that inputs characters from the left-hand side to the right-hand side.

6. The multi-character continuous handwriting input method as in claim 3, wherein the multi-character continuous handwriting input method is a left-to-right handwriting input method that inputs characters from the left-hand side to the right-hand side.

* * * * *